(12) United States Patent
Watts

(10) Patent No.: US 8,059,883 B1
(45) Date of Patent: Nov. 15, 2011

(54) ELECTRONIC KEY IDENTIFIER SYSTEM AND METHOD

(76) Inventor: Gerald W. Watts, Clearwater, FL (US)

( * ) Notice: Subject to any disclaimer, the term of this patent is extended or adjusted under 35 U.S.C. 154(b) by 1077 days.

(21) Appl. No.: 11/906,271

(22) Filed: Oct. 1, 2007

(51) Int. Cl.
G06K 9/00 (2006.01)

(52) U.S. Cl. ......... 382/141; 382/181

(58) Field of Classification Search .......... 382/100–305
See application file for complete search history.

(56) References Cited

U.S. PATENT DOCUMENTS

| | | | |
|---|---|---|---|
| 4,539,703 A * | 9/1985 | Clearman et al. | 382/288 |
| 4,899,391 A | 2/1990 | Cimino | |
| 5,055,658 A * | 10/1991 | Cockburn | 235/382 |
| 5,337,043 A * | 8/1994 | Gokcebay | 340/5.67 |
| 5,475,376 A * | 12/1995 | Chikamitue et al. | 340/5.73 |
| 5,771,176 A * | 6/1998 | Froehlich et al. | 708/135 |
| 5,807,042 A * | 9/1998 | Almblad et al. | 409/83 |
| 6,064,747 A * | 5/2000 | Wills et al. | 382/100 |
| 6,185,311 B1 * | 2/2001 | Yanovsky et al. | 382/100 |
| 6,449,381 B1 * | 9/2002 | Yanovsky et al. | 382/100 |
| 6,543,972 B1 * | 4/2003 | Cimino | 409/83 |
| 6,801,829 B2 | 10/2004 | Kawai | |
| 6,836,553 B2 * | 12/2004 | Campbell et al. | 382/100 |
| 6,839,449 B1 * | 1/2005 | Campbell et al. | 382/100 |
| 6,839,451 B2 * | 1/2005 | Campbell et al. | 382/100 |
| 6,895,100 B1 * | 5/2005 | Pacenzia et al. | 382/100 |
| 2002/0031251 A1 * | 3/2002 | Campbell et al. | 382/152 |
| 2002/0191849 A1 * | 12/2002 | Campbell et al. | 382/181 |
| 2009/0079539 A1 * | 3/2009 | Johnson | 340/5.83 |
| 2009/0180664 A1 * | 7/2009 | Efstathiades et al. | 382/100 |
| 2010/0316250 A1 * | 12/2010 | Perrigo | 382/100 |

* cited by examiner

*Primary Examiner* — Manav Seth

(57) ABSTRACT

A housing unit has an aperture for a key. A key reader is located within the housing unit. The key reader is adapted to scan a key in the aperture. The key reader is further adapted to generate a new key image signal. A memory drive is adapted to receive a key image signal from the key reader. The memory drive includes software. In this manner previously transmitted and stored key image signal transmissions are compared with newly transmitted key image signal transmissions. A screen is provided. The screen is capable of displaying information. The displayed information is provided by the software. The invention also includes the steps of utilizing the system of the present invention.

1 Claim, 3 Drawing Sheets

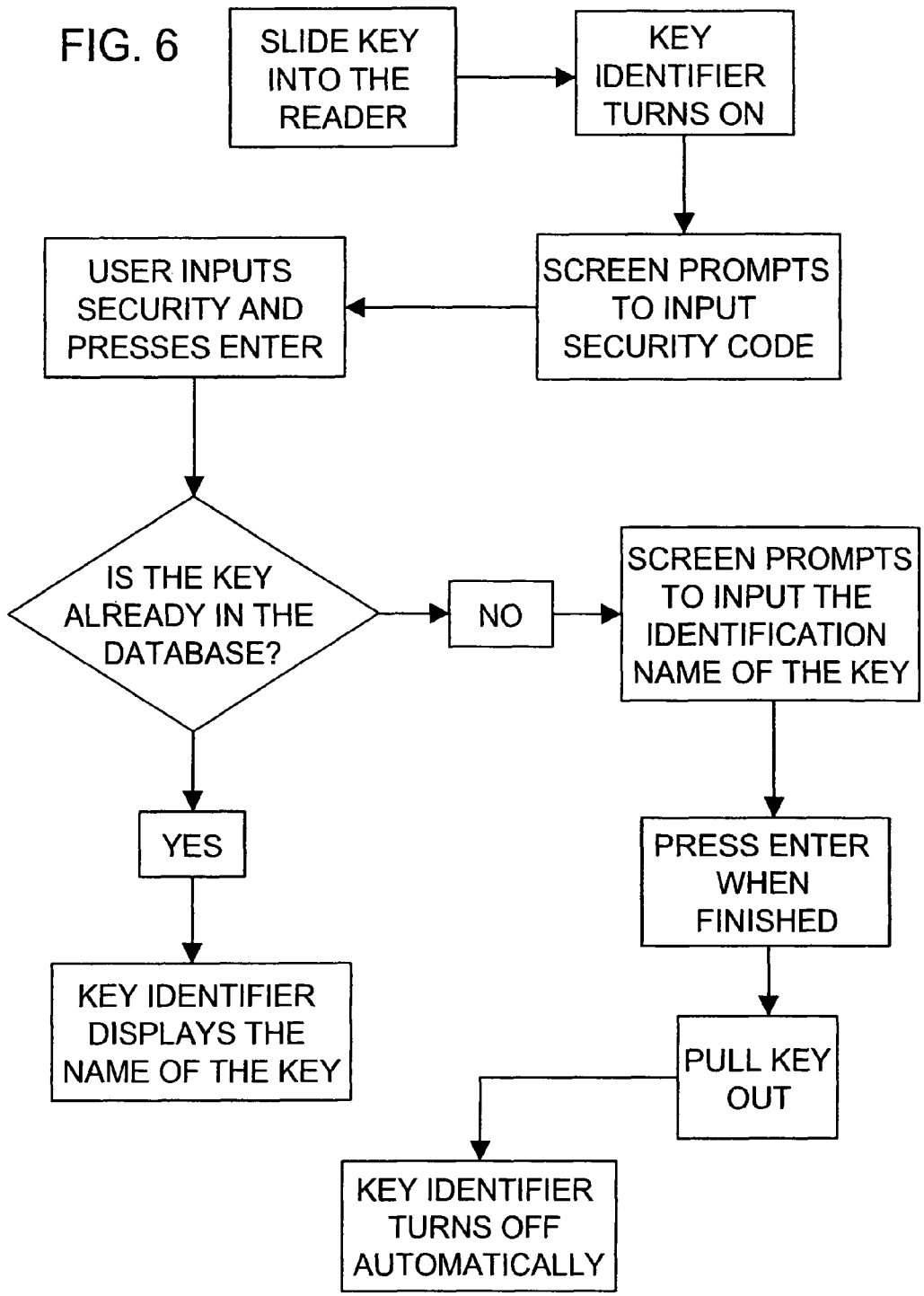

ELECTRONIC KEY IDENTIFIER SYSTEM AND METHOD

BACKGROUND OF THE INVENTION

1. Field of the Invention

The present invention relates to an electronic key identifier system and method and more particularly pertains to scanning, identifying and cataloguing keys in a reliable, convenient and economical manner.

2. Description of the Prior Art

The use of key systems of known designs and configurations is known in the prior art. More specifically, key systems of known designs and configurations previously devised and utilized for the purpose of controlling keys through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,899,391 issued Feb. 6, 1990 to Cimino relates to an Automatic Key Identification System. In addition, U.S. Pat. No. 6,801,829 issued Oct. 5, 2004 to Kawai relates to a Key Information Registration Procedure Assisting System, Recorded Medium, and Key Plate Cutter.

While known patents fulfill their respective, particular objectives and requirements, the aforementioned patents do not describe an electronic key identifier system and method that allows for scanning, identifying and cataloguing keys in a reliable, convenient and economical manner.

In this respect, the electronic key identifier system and method according to the present invention substantially departs from the conventional concepts and designs of the prior art, and in doing so provides an apparatus primarily developed for the purpose of scanning, identifying and cataloguing keys in a reliable, convenient and economical manner.

Therefore, it can be appreciated that there exists a continuing need for a new and improved electronic key identifier system and method which can be used for scanning, identifying and cataloguing keys in a reliable, convenient and economical manner. In this regard, the present invention substantially fulfills this need.

SUMMARY OF THE INVENTION

In view of the foregoing disadvantages inherent in the known types of key systems of known designs and configurations now present in the prior art, the present invention provides an improved electronic key identifier system and method. As such, the general purpose of the present invention, which will be described subsequently in greater detail, is to provide a new and improved electronic key identifier system and method which has all the advantages of the prior art and none of the disadvantages.

To attain this, the present invention essentially comprises an electronic key identifier system and method. First provided is a housing unit. The housing unit is in a generally rectangular configuration. The housing has a front, back, top, bottom, first side and second side. The first side has an aperture. The back has a recess. The recess has a cover. The recess is capable of receiving batteries. In this manner the system is powered.

A key is provided. The key is adapted to be inserted into the aperture. In this manner the key is scanned, identified and catalogued.

Provided next is a key reader. The key reader is located within the housing unit adjacent to the aperture. The key reader is adapted to scan a key in the aperture. The key reader is further adapted to generate a new key image signal for transmission.

A memory drive is provided next. The memory drive is located within the housing unit. The memory drive is operatively coupled with the key reader. The memory drive is selected from the class of drives. The class of drives includes flash drives and hard drives. The memory drive is adapted to receive a key image signal from the key reader. The memory drive is capable of storing information. The stored information relates to key image signals.

Software is provided. The software is installed in the memory drive. The software is adapted to interact with a user. In this manner previously transmitted and stored key image signal transmissions are compared with newly transmitted key image signal transmissions.

Further provided is a screen. The screen is selected from the class of screens. The class of screens includes LCD and plasma and CRT. The screen is located on the top of the housing unit. The screen is capable of displaying information. The displayed information is provided by the software and user.

Provided last is a push pad. The push pad is located on the front of the housing unit. The push pad has buttons. The buttons include a first row. The first row of buttons includes 1, 2 ABC, 3 DEF. The buttons include a second row. The second row of buttons includes 4 GHI, 5 JKL, 6 MNO. The buttons include a third row. The third row of buttons includes 7 PQRS, 8 TUV, 9 WXYZ. The buttons include a fourth row. The fourth row of buttons includes O. The buttons further include a bottom row. The bottom row of buttons includes CLEAR, SPACE and ENTER. The buttons of the push pad allow a user to input data and interact with the software.

The system is adapted to scan a key inserted into the aperture. The system generates a new key image signal. The system transmits such new key image signal to the memory drive. The system compares such transmitted new key image signal to previously transmitted key image signals. The previously transmitted key image signals are stored within the memory. If such new key image signal does not match a previously transmitted key image signal, the system inputs the identification name of the key and catalogues such key for future reference. If such new key image signal does match a previously transmitted key image signal, the systems displays on the screen the identification name of the key.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved electronic key identifier system and method which has all of the advantages of the prior art key systems of known designs and configurations and none of the disadvantages.

It is another object of the present invention to provide a new and improved electronic key identifier system and method which may be easily and efficiently manufactured and marketed.

It is further object of the present invention to provide a new and improved electronic key identifier system and method which is of durable and reliable constructions.

An even further object of the present invention is to provide a new and improved electronic key identifier system and method which is susceptible of a low cost of manufacture with regard to both materials and labor, and which accordingly is then susceptible of low prices of sale to the consuming public, thereby making such electronic key identifier system and method economically available to the buying public.

Even still another object of the present invention is to provide an electronic key identifier system and method for scanning, identifying and cataloguing keys in a reliable, convenient and economical manner.

Lastly, it is an object of the present invention to provide a new and improved electronic key identifier system and method. A housing unit has an aperture for a key. A key reader is located within the housing unit. The key reader is adapted to scan a key in the aperture. The key reader is further adapted to generate a new key image signal. A memory drive is adapted to receive a key image signal from the key reader. The memory drive includes software. In this manner previously transmitted and stored key image signal transmissions are compared with newly transmitted key image signal transmissions. A screen is provided. The screen is capable of displaying information. The displayed information is provided by the software. The invention also includes the steps of utilizing the system of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the primary and preferred embodiment of the present invention along with an alternate embodiment of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a flow diagram of the method of utilizing the system of the present invention.

The same reference numerals refer to the same parts throughout the various Figures including the primary and alternate embodiment of the invention.

DESCRIPTION OF THE PREFERRED EMBODIMENT

Figure 1:
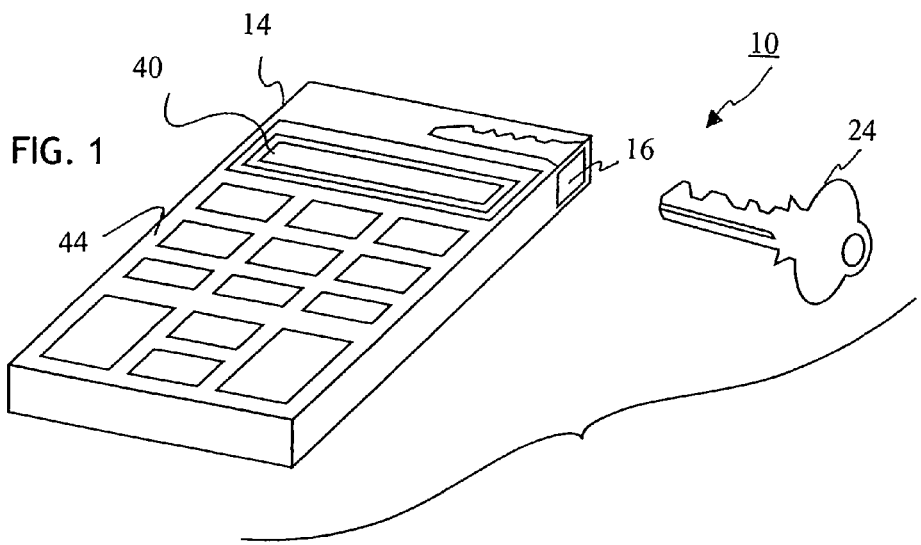
FIG. 1 is a perspective illustration of a key identifier system constructed in accordance with the principles of the present invention.
Figure 2:
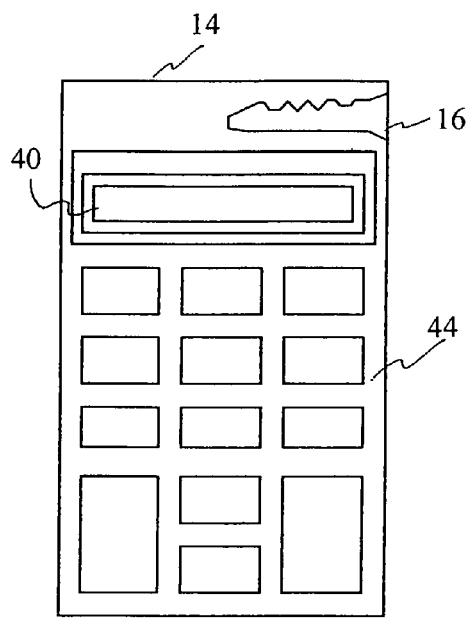
FIG. 2 is a front elevational view of the system shown in FIG. 1.
Figure 3:
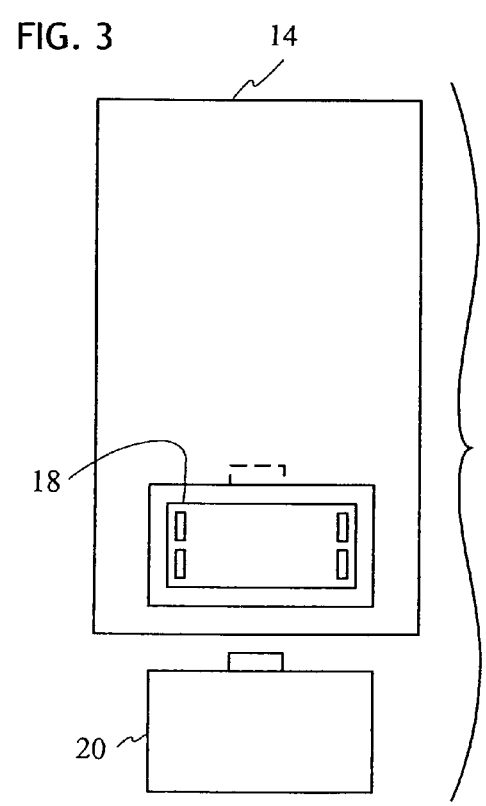
FIG. 3 is an exploded rear elevational view of the system of the prior Figures.
Figure 4:
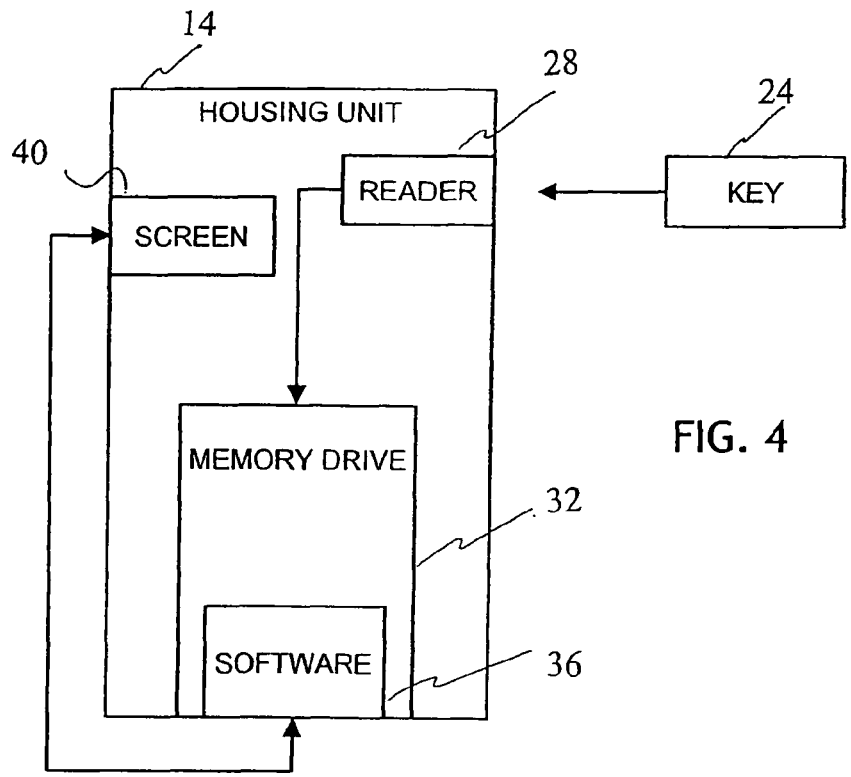
FIG. 4 is an electrical schematic illustration of the operating components of the system of the prior Figures.

With reference now to the drawings, and in particular to FIG. 1 thereof, the preferred embodiment of the new and improved electronic key identifier system and method embodying the principles and concepts of the present invention and generally designated by the reference numeral 10 will be described.

The present invention, the electronic key identifier system 10 is comprised of a plurality of components. Such components in their broadest context include a housing unit, a key reader, a memory drive and a screen. Such components are individually configured and correlated with respect to each other so as to attain the desired objective.

First provided is a housing unit 14. The housing unit is in a generally rectangular configuration. The housing has a front, back, top, bottom, first side and second side. The first side has an aperture 16. The back has a recess 18. The recess has a cover 20. The recess is capable of receiving batteries. In this manner the system is powered.

A key 24 is provided. The key is adapted to be inserted into the aperture. In this manner the key is scanned, identified and catalogued.

Provided next is a key reader 28. The key reader is located within the housing unit adjacent to the aperture. The key reader is adapted to scan a key in the aperture. The key reader is further adapted to generate a new key image signal for transmission.

A memory drive 32 is provided next. The memory drive is located within the housing unit. The memory drive is operatively coupled with the key reader. The memory drive is selected from the class of drives. The class of drives includes flash drives and hard drives. The memory drive is adapted to receive a key image signal from the key reader. The memory drive is capable of storing information. The stored information relates to key image signals.

Software 36 is provided. The software is installed in the memory drive. The software is adapted to interact with a user. In this manner previously transmitted and stored key image signal transmissions are compared with newly transmitted key image signal transmissions.

Further provided is a screen 40. The screen is selected from the class of screens. The class of screens includes LCD and plasma and CRT. The screen is located on the top of the housing unit. The screen is capable of displaying information. The displayed information is provided by the software and user.

Provided last is a push pad 44. The push pad is located on the front of the housing unit. The push pad has buttons. The buttons include a first row. The first row of buttons includes 1, 2 ABC, 3 DEF. The buttons include a second row. The second row of buttons includes 4 GHI, 5 JKL, 6 MNO. The buttons include a third row. The third row of buttons includes 7 PQRS, 8 TUV, 9 WXYZ. The buttons include a fourth row. The fourth row of buttons includes O. The buttons further include a bottom row. The bottom row of buttons includes CLEAR, SPACE and ENTER. The buttons of the push pad allow a user to input data and interact with the software.

The system is adapted to scan a key inserted into the aperture. The system generates a new key image signal. The system transmits such new key image signal to the memory drive. The system compares such transmitted new key image signal to previously transmitted key image signals. The previously transmitted key image signals are stored within the memory. If such new key image signal does not match a previously transmitted key image signal, the system inputs the identification name of the key and catalogues such key for future reference. If such new key image signal does match a previously transmitted key image signal, the systems displays on the screen the identification name of the key.

Figure 5:
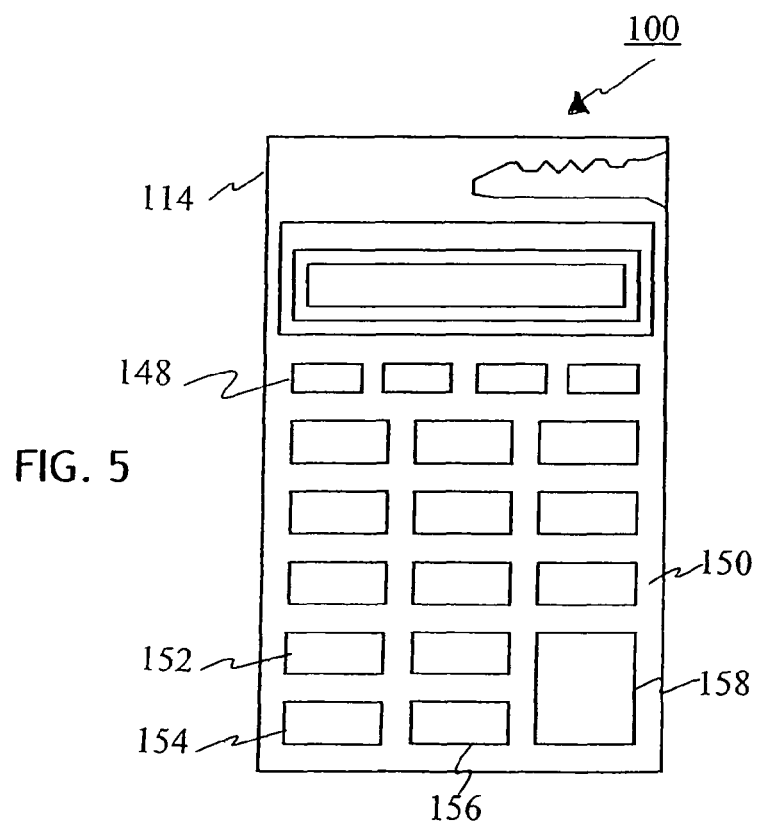
FIG. 5 is a front elevational view of an alternate embodiment of the invention.

An alternate embodiment of the invention is illustrated in FIG. 5. A housing unit 114 is provided. The housing unit has a push pad. The push pad is located on the front of the housing unit. The push pad has buttons. The buttons include a first row. The first row of buttons includes 1, 2 ABC, 3 DEF. The buttons include a second row. The second row of buttons includes 4 GHI, 5 JKL, 6 MNO. The buttons include a third row. The third row of buttons includes 7 PQRS, 8 TUV, 9 WXYZ. The buttons also include a fourth row. The fourth row of buttons includes O. The buttons further include a bottom row. The bottom row of buttons includes CLEAR, SPACE and ENTER. The buttons of the push pad allowing a user to input data and interact with the software.

The push pad includes a supplemental upper row of buttons 148. The supplemental upper row of buttons is provided between the screen and the first row of buttons. The supplemental upper row of buttons includes +, −, X and ./.. The buttons included in the supplemental upper row of buttons facilitate arithmetic functions. The other components of the invention in the alternate embodiment are the same as in the primary embodiment as described above.

The push pad includes a supplemental lower row of buttons 150 adjacent to the bottom of the housing unit with MODE 152 above and CLEAR 154 below, SPACE 156 centrally and ENTER=158 to facilitate both the arithmetic function and the key related functions. With a key in the aperture, a user may press the mode button to determine whether the system is to function as a conventional calculator or a key handling system as in the primary embodiment.

The invention also includes a method for scanning, identifying and cataloguing keys in a reliable, convenient and economical manner.

The first step is providing a housing unit 14. The housing unit is in a generally rectangular configuration. The housing unit has a front, back, top, bottom, first side and second side. The first side has an aperture 16. The back has a recess 18. The recess has a cover 20. The recess is capable of receiving batteries. In this manner the system is powered.

The second step is providing a key 24. The key is adapted to be inserted into the aperture. In this manner the key is scanned, identified and catalogued.

The third step is providing a key reader 28. The key reader is located within the housing unit adjacent to the aperture. The key reader is adapted to scan a key in the aperture. The key reader is further adapted to generate a new key image signal for transmission.

The fourth step is providing a memory drive 32. The memory drive is located within the housing unit. The memory drive is operatively coupled with the key reader. The memory drive is selected from the class of drives. The class of drives includes flash drives and hard drives. The memory drive is adapted to receive a key image signal from the key reader. The memory drive is capable of storing information. The stored information relates to key image signals.

The fifth step is providing software 36. The software is installed in the memory drive. The software is adapted to interact with a user. In this manner previously transmitted and stored key image signal transmissions is compared with newly transmitted key image signal transmissions.

The sixth step is providing a screen 40. The screen is selected from the class of screens. The class of screens includes LCD and plasma and CRT. The screen is located on the top of the housing unit. The screen is capable of displaying information. The displayed information is provided by the software and user.

The seventh step is providing a push pad 44. The push pad is located on the front of the housing unit. The push pad has buttons. The buttons include a first row. The first row of buttons includes 1, 2 ABC, 3 DEF. The buttons include a second row. The second row of buttons includes 4 GHI, 5 JKL, 6 MNO. The buttons include a third row. The third row of buttons includes 7 PQRS, 8 TUV, 9 WXYZ. The buttons also include a fourth row. The fourth row of buttons includes O. The buttons further include a bottom row. The bottom row of buttons includes CLEAR, SPACE and ENTER. The buttons of the push pad allow a user to input data and interact with the software.

The eighth step is inserting a key into the reader. In this manner the electronic key identifier is turned on.

The ninth step is inputting a security code'using the push pad when prompted to do so by the electronic key identifier.

The tenth step is scanning the input key by reader in the electronic key identifier.

The eleventh step is displaying the name of the key that the user already programmed if using a known key.

The twelfth step is naming the key when asked to do so by the electronic key identifier using the push pad if using an unknown key.

The thirteenth step is pressing enter on the push pad. In this manner the data that is being input in the electronic key identifier is submitted and confirmed.

The final step is pulling the key out and turning the electronic key identifiers off.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An electronic key identifier method for scanning, identifying and cataloguing keys in a reliable, convenient and economical manner comprising in combination:

providing a housing unit in a generally rectangular configuration with a front, back, top, bottom, first side and second side, the first side having an aperture, and the back having a recess with a cover capable of receiving batteries for powering the system;

providing a key adapted to be inserted into the aperture for being scanned, identified and catalogued;

providing a key reader located within the housing unit adjacent to the aperture adapted to scan a key in the aperture and then to generate a new key image signal for transmission;

providing a memory drive located within the housing unit and operatively coupled with the key reader, the memory drive selected from the class of drives including flash drives and hard drives and adapted to receive a key image signal from the key reader, the memory drive capable of storing information relating to key image signals;

providing software installed in the memory drive adapted to interact with a user for comparing previously transmitted and stored key image signal transmissions with newly transmitted key image signal transmissions;

providing a screen selected from the class of screens including LCD and plasma and CRT located on the top of the housing unit capable of displaying information provided by the software and user;

providing a push pad located on the front of the housing unit with buttons including a first row with 1, 2 ABC, 3 DEF, and a second row with 4 GHI, 5 JKL, 6 MNO, and a third row with 7 PQRS, 8 TUV, 9 WXYZ and a fourth row with 0 and a bottom row with CLEAR, SPACE and ENTER, the buttons of the push pad allowing a user to input data and interact with the software;

inserting a key into the reader which turns the electronic key identifier on;

inputting a security code using the push pad when prompted to do so by the electronic key identifier and then pressing ENTER on the push pad;

scanning the input key by reader in the electronic key identifier;

displaying the name of the key that the user already programmed if using a known key;

naming the key when asked to do so by the electronic key identifier using the push pad if using an unknown key;

pressing ENTER on the push pad to submit and confirm the data that is being input in the electronic key identifier; and pulling the key out and turning the electronic key identifiers off.

* * * * *